(12) United States Patent
Mertz et al.

(10) Patent No.: US 6,299,945 B1
(45) Date of Patent: Oct. 9, 2001

(54) PROCESSES FOR MAKING RELEASE LINERS

(75) Inventors: William J. Mertz, Carol Stream; Danny Charles Thompson, Streamwood; Katherine Yiu-Kit Leung, Rolling Meadows, all of IL (US)

(73) Assignee: Loparex Inc., Willowbrook, IL (US)

( * ) Notice: Subject to any disclaimer, the term of this patent is extended or adjusted under 35 U.S.C. 154(b) by 0 days.

(21) Appl. No.: 09/239,208

(22) Filed: Jan. 28, 1999

(51) Int. Cl.[7] .................................................. C08J 7/04
(52) U.S. Cl. ...................... 427/503; 427/208; 427/208.4; 427/378; 427/387; 427/505; 427/515; 427/516; 427/551; 427/557; 427/558; 427/559
(58) Field of Search ...................... 427/515, 551, 427/516, 378, 557, 558, 559, 387, 208, 208.4, 503, 505

(56) References Cited

U.S. PATENT DOCUMENTS

| 4,201,808 | 5/1980 | Cully et al. . |
|---|---|---|
| 4,443,491 | 4/1984 | McIntyre . |
| 4,603,086 | 7/1986 | Fujii et al. . |
| 4,871,611 | 10/1989 | LeBel . |
| 4,908,274 | 3/1990 | Jachmann et al. . |
| 5,217,805 | 6/1993 | Kessel et al. . |
| 5,468,824 | * 11/1995 | Togashi et al. . |
| 5,527,578 | 6/1996 | Mazurek et al. . |
| 5,654,093 | 8/1997 | Kidon et al. . |
| 5,658,965 | 8/1997 | Manzouji et al. . |
| 5,753,346 | 5/1998 | Leir et al. . |
| 5,843,549 | 12/1998 | Mingus . |

FOREIGN PATENT DOCUMENTS

| 0 415 769 A3 | 3/1991 | (EP) . |
|---|---|---|
| 0 542 484 A | 5/1993 | (EP) . |
| WO 98/28376 | 7/1998 | (WO) . |

* cited by examiner

Primary Examiner—Bernard Pianalto
(74) Attorney, Agent, or Firm—Wallenstein & Wagner

(57) ABSTRACT

Release liners and processes for making the same are disclosed. The release liners include no more than about 1.5 micrograms/square centimeter of nonreacted silicone materials (extractables). The release liners are prepared using solvent coating of radiation curable silicone release materials.

28 Claims, 1 Drawing Sheet

PROCESSES FOR MAKING RELEASE LINERS

FIELD OF THE INVENTION

This invention relates to sheet materials, and more particularly to release liner sheet materials, and to processes for making the same.

BACKGROUND OF THE INVENTION

Silicone containing materials are widely applied to film, paper and other substrates to impart release properties thereto. Historically, many of these silicone materials have been solvent based and catalyzed by metallic catalysts such as tin, rhodium or platinum. These release coatings have provided desirable levels of release for many applications. However, because of increased environmental concerns regarding the release of volatile organic compounds (VOCs) that can result from the use of such solvent based systems, the industry has been shifting its focus to solventless (100% solids) release systems.

Solventless systems include thermally cured silicone release compositions (e.g. platinum catalyzed systems) and radiation cured systems (cured by UV or EB radiation). Thermally cured silicone release systems can require large quantities of energy and extensive manufacturing floor space for the thermal cure equipment. Radiation cured systems require less manufacturing floor space and are more energy efficient. However, many release liner manufacturers have invested heavily in thermal cure equipment that is not readily displaced and/or converted to radiation curing lines.

Both solvent based and solventless silicone release systems can impart desirable release properties to the substrate to which it is applied. However, an increasing number of applications require a silicone release coating that minimizes the migration or transfer of unreacted silicone compounds in the release coating onto an adjacent surface such as an adhesive or the backside of the support substrate in addition to providing the desired release level.

For example, unreacted or non-crosslinked silicone compounds present in the cured silicone release layer can migrate onto an adjacent adhesive layer and reduce its adhesive properties. Silicone migration or volatilization is also problematic for silicone-sensitive end uses, such as in the microelectronics and automotive industries. Silicones can also transfer to the backside of the support substrate of a release liner stored in roll form resulting in a surface that is difficult or impossible to print. Furthermore, the silicone which transfers to the backside of the support substrate can re-transfer to another substrate which has been adhesively or otherwise laminated to the release liner. This re-transfer of silicone can also cause printing problems such as poor adhesion or non-wetting of the ink.

SUMMARY OF THE INVENTION

The present invention provides release liner sheets which include a substrate and a radiation cured silicone release coating on a surface thereof. The present invention also includes substrates wherein both surfaces are coated with radiation cured silicone release coatings. In this aspect of the invention, the release coatings may be the same or different.

The release coating exhibits desirable release properties as well as reduced amounts of undesirable components. For example, the release liners of the invention exhibit reduced total silicone extractables (unreacted silicone materials). Generally the release coatings include no more than about 1.5, preferably no more than about 0.9, and most preferably no more than about 0.2, micrograms per square centimeter total silicone extractables.

Further, the release liners can have reduced amounts of volatile silicone compounds, such as low molecular weight siloxanes typically found in radiation curable silicone compositions. Preferably the release liner of the invention has no more than about 10 parts per million (ppm), and more preferably less than about 2.0 ppm, of such compounds in the cured release layer.

As a result of significantly reduced amounts of total extractables and/or volatile silicone compounds in the cured release layer, the release liners of the invention can exhibit minimal or substantially no silicone transfer to adjacent surfaces, such as the backside of the support substrate, adjacent adhesive layers, and the like. This in turn provides several advantages, such as minimizing the reduction of adhesive properties of adjacent adhesive layers due to silicone transfer; minimizing the development of printing problems on face stock due to silicone contamination; minimizing or eliminating silicone migration in microelectronic applications; and the like.

The present invention also provides processes for making the release liners. In this embodiment of the invention, a composition comprising a radiation curable silicone release agent in an organic solvent is applied to a surface of a substrate. Any of the types of radiation curable silicone release materials can be used in accordance with the invention. A variety of organic solvents can also be employed, for example, aliphatic, aromatic, ketone and other solvents as well as mixtures of such solvents. Typically, the composition includes about 1 to about 90 weight percent, preferably about 4 to about 20, and more preferably about 6 to about 15, weight percent radiation curable silicone release agent, and about 99 to about 10, preferably about 96 to about 80, and more preferably about 94 to about 85, weight percent solvent, based on the total weight of the composition.

The coated substrate is then treated under conditions sufficient to remove substantially all of the solvent, for example by heat and/or high velocity air. The resultant coated substrate is then exposed to radiation, such as ultraviolet radiation or electron beam radiation, under conditions sufficient to substantially cure the radiation curable silicone release agent to form a radiation cured silicone release coating.

Unexpectedly, the inventors have found that application of radiation curable silicone release materials in a solvent forms a release liner having significantly reduced amounts of total extractables and/or volatile organic compounds, as discussed above. In addition, the process of the invention can provide many manufacturing advantages. For example, the process provides release liners having desired release and other properties using lower coat weights, as compared to conventional solventless radiation cured systems. Typically, radiation curable silicone release compositions are applied at relatively high coat weights, as compared to solvent or water based systems. Because radiation curable silicone compositions can be expensive, the ability to reduce coat weights without adversely affecting release properties can reduce raw material costs.

In addition, equipment currently used with thermal cure systems can be readily adapted for use in the process of the invention. Still further, productivity of thermal cure equipment can be increased. For example, the lines can be run at increased speeds because the dwell time required to remove solvent, as compared to the dwell time required to thermally cure traditional metal catalyzed silicone systems, is significantly less.

BRIEF DESCRIPTION OF THE DRAWINGS

Some of the features and advantages of the invention having been described, others will become apparent from the detailed description which follows, and from the accompanying drawings, in which.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
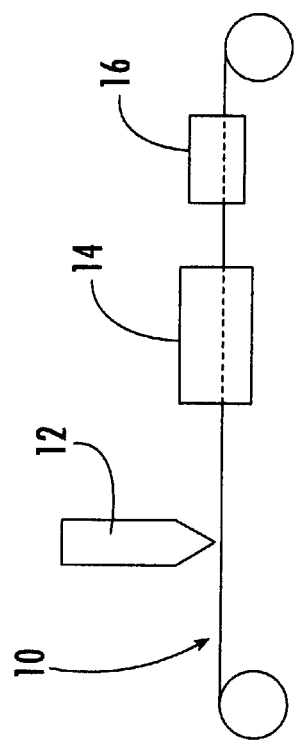
FIG. 1 a schematic representation of an exemplary process for making the release liners of the invention.

Referring to FIG. 1, an exemplary process for making the release liners of the invention is illustrated. A substrate, generally designated as 10, is directed from a supply roll to a coating apparatus 12. Substrate 10 can be any of the types of substrates known in the art to which a release coating can be applied, including, without limitation, polymeric substrates, such as polymer films, polymer foams, sheets formed of synthetic staple fibers and/or filaments, and the like; cellulosic substrates, such as paper substrates, woven, knit, netted or nonwoven fabric substrates formed of natural fibers and/or filaments, and the like; substrates including both polymeric and cellulosic components, for example, a cellulosic sheet, such as a paper sheet, coated on one or both surfaces with a polymer coating to form a polymer coated paper substrate; metal foils; clay coated paper; and the like. Exemplary polymers include polyolefins such polyethylene and polypropylene; polyesters, such as polyethylene terephthalate; polyvinyl chloride; polyamide; polystyrene; co-polyester; polycarbonate; polyketone, and the like.

As illustrated in FIG. 1, coating apparatus 12 applies a radiation curable silicone release composition to substrate 10. The release composition can be applied to substrate 10 using any of the techniques known in the art, such as, but not limited to, roll coating, gravure coating, multi-roll coating, reverse roll, air knife, wire wound rod, and the like and other coating processes.

As the skilled artisan will appreciate, the term radiation curable silicone release composition refers to compositions which photopolymerize or cure upon exposure to radiation. Generally the composition includes photopolymerizable silicone compounds, typically one or more reactive polysiloxanes, which are capable upon exposure to radiation of curing or crosslinking. The photopolymerizable silicone compounds can comprise monomers, oligomers, polymers, prepolymers, resinous materials and mixtures thereof. Radiation curable silicone compounds include epoxy, acrylate, vinyl ethers, and other functionalized silicone compounds as known in the art.

Typically radiation curable silicone compositions also include one or more photoinitiators, which when exposed to a source of radiation, initiate a reaction of the photopolymerizable silicone materials. They generally fall into one of two categories based on their mechanism of cure: free radical mechanism or cationic mechanism. Exemplary photoinitialors for the free radical mechanism include benzil dimethyl ketal, benzoin, benzoin alkyl ethers, acyloin derivatives, benzophenone, acetophenone, Michler's ketone, acyl phosphine oxide derivatives, and the like and derivatives of these compounds. For cationic radiation curable systems, the photoinitiators include iodonium or sulfonium salts, witlr the anions being fluorinated antimonates, or more recently pentafluorophenyl borates. These systems can be cured by radiation such as gamma, x-ray, electron beam, or ultraviolet light. For ionizing radiation such as electron beam or gamma ray radiation, the photoinitiators may not be required for the free-radical systems. For the cationic systems, it is generally recognized that the photoinitiators are necessary even with high energy electron beam cure.

Radiation curable silicone compositions are well known and are commercially available. Exemplary compositions useful in the present invention include, without limitation, UV9400 and UV9380C (trade name), commercially available from General Electric Silicones, PC-600 and PC-702 (trade name), commercially available from Rhodia Silicones, and the like, and mixtures thereof.

In contrast to conventional processes for making radiation cured silicone release liners, in the present invention, the release composition is applied as a solvent-based, not solventless, system. This is counterintuitive because radiation curable silicone release compositions were developed as solventless systems to eliminate the use of solvents in the production of release coatings. Thus, in contrast to their contemplated use, in the present invention, the radiation curable silicone compositions are first dispersed or dissolved in a suitable solvent and then applied to the substrate.

Any suitable solvent can used, including without limitation, aliphatic solvents such as hexane, heptane, naphtha, and the like; cycloaliphatic solvents such as cyclohexane, and the like; aromatic solvents such as xylene, toluene, and the like; ketone solvents, such as methyl ethyl ketone, cyclohexanone, methyl iso-butyl ketone and the like, and mixtures thereof. Generally, the solvent based radiation curable silicone release composition comprises radiation curable silicone compounds in an amount ranging from about 1 to about 90 weight percent, preferably from about 4 to about 20, and most preferably from about 6 to about 15, weight percent of the solvent composition, based on the total weight of the solvent composition. The solvent comprises from about 99 to about 10, preferably about 96 to about 80, and most preferably about 94 to about 85, weight percent of the composition as applied to the substrate.

The coating weight can vary, depending upon the various factors, the most significant variables being the percent solids, viscosity of the formula, and process conditions. Process conditions in this coating process can include one or more of several variables depending on the coating method used (roll speeds for the multi-roll methods, rod size for Meyer rod, gravure cell size and roll speeds for direct or offset gravure methods).

Typically, the solvent based radiation curable silicone release composition is applied to the substrate in an amount sufficient to provide a cured release layer having a thickness sufficient to impart the desired release properties of the release liner sheet of the invention. Preferably the composition is applied in an amount sufficient to provide a coating weight of about 0.1 to about 1.0 grams per square meter (dry), more preferably a coating weight of about 0.1 to about 0.6 grams per square meter (dry), and most preferably a coating weight of about 0.1 to about 0.3 grams per square meter (dry). One advantage of the present invention is the ability to reduce coat weights by dispersing the radiation curable silicone materials in solvent prior to application to the substrate surface.

After the uncured composition is applied to a surface of substrate 10, the coated substrate is then directed to solvent removal zone, indicated in FIG. 1 as 14. Solvent can be removed using conventional techniques. For example, in one embodiment of the invention, solvent removal zone is a conventional oven known in the art for removing solvent by the use of heat and/or high velocity air. Conditions for removing solvent such as temperature and the like are known and can vary depending upon the solvent used, the method of removal, line speed and the like. Useful temperatures ranges from about 100° F. to about 325° F., although temperatures outside of these ranges can be used as well, Generally, the substrate is subjected to conditions sufficient to remove substantially all of the solvent present in the release composition.

As illustrated in FIG. 1, after the solvent has been removed, the substrate exits solvent removal zone 14 and is directed to a radiation curing apparatus designated generally as 16. Here, the composition can be cured by exposure to radiation under conditions suitable for converting the composition into a cross-linked polymer film adhered to the surface of the substrate. The active energy beams used in accordance with the present invention may be ultraviolet light or may contain in their spectra both visible and ultraviolet light. The polymerization may be activated by irradiating the composition with ultraviolet light using any of the techniques known in the art for providing ultraviolet radiation, i.e., in the range of 240 nm and 420 nm ultraviolet radiation, or by irradiating the composition with radiation outside of the ultraviolet spectrum. The radiation may be natural or artificial, monochromatic or polychromatic, incoherent or coherent and should be sufficiently intense to activate polymerization. Conventional radiation sources include mercury, metal additive and arc lamps. Coherent light sources are the pulsed nitrogen, xenon, argon ion- and ionized neon lasers whose emissions fall within or overlap the ultraviolet or visible absorption bands of the compounds of the invention.

The radiation time can depend on the intensity of the radiation source, the type and amount of photoinitiator and the permeability of the composition and the substrate to radiation. The substrate can be exposed to radiation for a period ranging from about 0.02 second to about 5 seconds. Irradiation can be carried out in an inert gas atmosphere if required.

Alternatively, as noted above, the substrate can be exposed to other types of radiation, for example, electron beam. Conditions for curing radiation curable silicone release compositions using electron beam are also known in the art.

Substrate 10 then exits the curing chamber and is taken up in roll form. Alternatively, the substrate can be directed to additional downstream processing. For example, the substrate can be routed so as to apply a second release coating to an opposing surface of the substrate. Preferably a second coating of the solvent based radiation curable silicone release composition is applied to the second surface of the surface as described above, but any of the types of release coating compositions known in the art can be used. The second release coating can be selected so as to provide similar or different release properties from that of the first release coating.

Figure 2:
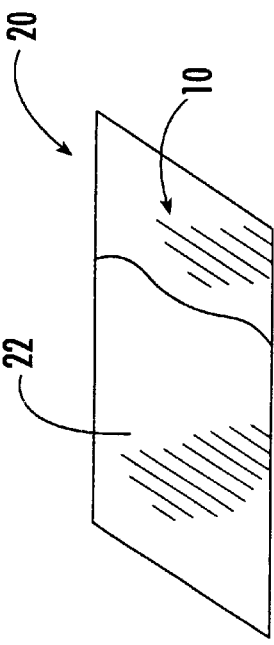
FIG. 2 is a schematic perspective view showing a release liner in accordance with the present invention with the respective layers of the release liner being exposed for clarity of illustration.

Turning now to FIG. 2, a schematic perspective view of a release liner material designated generally as 20 is illustrated. In FIG. 2, the respective layers of the release liner 20 are exposed for clarity of illustration. Generally release liner 20 includes substrate 10 and a release layer 22 on at least one surface thereof. The release liner 20 can also include release layers on opposing surfaces of substrate 10 (not illustrated). The resultant release liner of the invention differs structurally from conventional release liners. For example, the release liners of the invention are characterized by significantly reduced amounts of total extractables (i.e., non-reacted siloxanes) as compared to release liners prepared using solventless radiation cured silicone release compositions. Generally the release liner comprises no more than about 1.5 micrograms per square centimeter total extractables, preferably no more than about 0.9 micrograms per square centimeter total extractables, and most preferably no more than about 0.2 micrograms per square centimeter total extractables.

Total silicone extractables are measured by taking a known area of release liner, usually a 10 inch square sample and cutting the sample into 0.5 inch squares. The samples are placed in ajar, and 30 mL of methyl isobutyl ketone is poured in. The jar is sealed, and put on an orbital shaker for 30 minutes with the shaker set at 200 revolutions per minute. The extract from the silicone-coated samples is decanted into small bottles. Then, the extract is introduced into flame atomic absorption unit (for example, a Perkin-Elmer Atomic Absorption Spectrometer 3300 unit). Elemental silicon is detected and quantified, converting that amount to percent extractables, or to the units of micrograms of silicone per square centimeter. The reference for this test is Rexam Release RTM Number 83.

In addition, the release liners of the invention can be characterized as having significantly reduced amounts of volatile silicone compounds. Typically radiation curable silicone release compositions include numerous low molecular weight, low boiling point siloxane compounds. The outgassing siloxane compounds are classified into three boiling point ranges: low boiling (>C6–C10), medium boiling (>C10–C20), and high boiling (>C20–C28). These ranges are based on the comparisons of the siloxanes with the retention times of a C6–C28 n-hydrocarbon external standard.

Typically the release coating of the release liners of the invention comprises no more than about 10 ppm, preferably no more than about 2.0 ppm, volatile compounds. Volatile organic compounds outgassed from release liner samples were tested as follows. First, portions of the release liner sample, approximately 4 square centimeters, were heated at 100° C. for 30 minutes in the dynamic headspace outgassing instrument. The volatiles are captured and analyzed by thermal desorption gas chromatography, and mass spectroscopy. The measurements are usually reported as total siloxanes in units of nanograms per square centimeter, or total organic outgassing, also in nanograms per square centimeter.

Although not wishing to be bound by any explanation of the invention, it is currently believed that treating the coated substrate with heat and/or high velocity air not only drives off the solvent but also can provide molecular agitation of the compositions. As a result, volatile silicone compounds which are present in such compositions can be driven off as well, thereby reducing the amounts of such compounds in the cured product. Further, as discussed above, coating weights can be reduced by dispersing the release composition in a solvent, thereby reducing the total amount of silicone release composition required. This in turn results in significantly reduced total amounts of extractables. As a result, the release liners of the invention can exhibit minimal or substantially no transfer of uncured silicone to adjacent surfaces, for example, to the backside of the substrate when stored in roll form, to adhesive layers, etc.

The amount of migratory silicones in a release liner can be characterized by analyzing the surface of an adhesive for silicon after contact with the liner. X-ray photoelectron spectroscopy (XPS) is the analytical technique often used for this study. XPS is also referred to as ESCA (Electron Spectroscopy for Chemical Analysis). The test characterizes the adhesive surface by determining the percentage of certain elements. Elemental silicon is quantified and reported as the atom percentage of all the relevant elements in the adhesive. Generally, some transfer is seen from all silicone release liners, but the goal is to reduce this as much as possible. Results under 5% silicon are generally considered as low migration or transfer of silicone.

Figure 3:
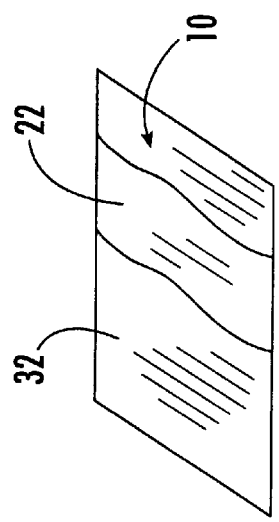
FIG. 3 is a schematic perspective view of a composite laminate product that includes the release liner of the invention as a component.

The release liners of the invention can be used in combination with other sheet materials as known in the art. For example, as illustrated in FIG. 3, adhesive can be applied to the release layer of the release liner sheet so as to form an adhesive layer 32 that is releasably adhered to the release liner 20. The adhesive layer/release liner composite structure can thereafter be directed into face-to-face relationship with a suitable substrate to form a release liner/adhesive/substrate structure such that the adhesive layer is sandwiched between the substrate and release liner sheet. Alternatively, the adhesive may be sandwiched between two release liners to form an unsupported adhesive construction The adhesive layer can be formed of various suitable conventional adhesives known in the art, preferably a pressure sensitive adhesive. Pressure sensitive adhesives in dry form (substantially solvent free except for residual solvent) are typically aggressively and permanently tacky at room temperature (e.g., from about 15 to about 25° C.) and firmly adhere to a variety of surfaces upon contact without the need for more than manual pressure. Such adhesives typically do not require activation by water, solvent or heat to exert a strong adhesive holding force towards materials such as paper, glass, plastics, wood, and metals.

Exemplary pressure sensitive adhesives may be based on rubber-resin materials, polyolefins, acrylics, polyurethanes, polyesters, and polyamides. The pressure sensitive adhesive may be solvent-based, water-based, 100% solids, hot-melt based or other forms, all as well known in the art. The adhesives can be crosslinked by heat, UV or EB radiation or other techniques well known in the art. Specific examples of pressure sensitive adhesives include polyolefin-based polymers, such as polypropylene- or polyethylene-based polymers, and ethylene copolymers, such as ethylene vinyl acetate copolymers; acrylic-based adhesives, such as isooctyl acrylate/acrylic acid copolymers and tackified acrylate copolymers; tackified rubber-based adhesives, such as tackified styrene-isoprene-styrene block copolymers, tackified styrene-butadiene-styrene block copolymers and nitrile rubbers, such as acrylonitrile-butadiene. Non-pressure sensitive coatings, such as inks, thermally activated adhesives, solvent activated adhesives, and the like can also be used.

The support substrate can be any of the type of substrates as described above. Advantageously, a surface of the support substrate of the composite product opposite adhesive layer 32 is rendered receptive to printed indicia, i.e., inks. Printed indicia can be applied to the surface of the support substrate prior to or subsequent to its use, for example, prior to or subsequent to application of the face sheet to a substrate surface. The surface can also be embossed, colored, metallized or otherwise decorated. The surface of support substrate can be rendered receptive to printed indicia using techniques known in the art, such as corona treatment of the substrate surface, application of an additional layer to the substrate surface which is receptive to printed indicia, and the like. The release liners of the invention are especially useful in the applications described above. The extremely low levels of extractables and volatiles minimizes printing problems such as poor adhesion or non-wetting due to the transfer of silicone from the backside of the release liner to the face side of the support substrate.

The use of solvent applied radiation curable silicone release compositions as release layers in the release liner sheets of the present invention can result in a variety of desirable characteristics. Because coating weights are reduced, manufacturing costs, such as the cost of resin, can be reduced. In addition, the process can be readily adapted to currently existing equipment, such as that used for thermally cured systems. Still further, the process can provide increased production speeds, thereby increasing productivity.

The present invention will be further described by the following non-limiting examples.

EXAMPLE 1

A two-mil thick polyester film (Mylar® Type A supplied by Dupont) is coated with a radiation curable silicone composition dispersed in solvent by a method such as direct gravure coating or Meyer rod coating. The silicone coating is done on one side. After the silicone is applied, the material is directed through a forced air oven at a temperature of 250° F. and a line speed of 400 feet per minute to remove solvents, and then exposed to UV light (two banks of Fusion H medium pressure mercury UV bulbs rated at 375 watts/in each) to chemically crosslink the silicone release coating.

The solvent based radiation curable silicone release composition includes the following components:

| Ingredient | Amount |
|---|---|
| Rhodia PC-620 epoxy-silicone | 18 parts |
| Rhodia PC-702 photocatalyst | 0.54 parts |
| Heptane | 248 parts |
| Toluene | 44 parts |

Rhodia PC-620 is an epoxy functionalized silicone commercially available from Rhodia Silicones, and Rhodia PC-702 photocatalyst is a photoinitiator, also commercially available from Rhodia Silicones.

Properties of the release liner are listed below, given as typical values:

| | |
|---|---|
| Caliper | 2.0 mils |
| Coat Weight | Target 0.15 lbs/3000 square feet |
| | (0.28 g/sq meter) |
| Release Force | 25 grams/2 inch width |
| Extractables | <3% of coat weight |

| | |
|---|---|
| Volatiles | <100 nanograms/sq cm |
| Subsequent Adhesion | >90% of control |

Caliper was measured using ASTM test method E252. Coat weight, release force, and subsequent adhesion were evaluated using internal test methods RR STM Number 36; RR STM Number 8; and RR STM Number 42, respectively, as described below.

STM Number 36—Coat Weight by X-Ray Fluorescence Spectrophotometer

This test determines the coat weight of a release liner using an X-Ray fluorescence spectrophotometer. (Oxford Analyzer—Lab X-3000)
1) Select the type of release liner (paper or poly coated paper, clay coated paper, or film)
2) Test the uncoated blank sample from the same lot as the release liner.
3) Test the silicone coated side of the release liner that used the same substrate as the blank. Read out the silicone weight in pounds/3000 square feet.

STM Number 8—Release Test

The STM Number 8 release test measures the force required to remove an acrylic PSA (pressure sensitive adhesive) from a release liner.
1) A solvent acrylic adhesive, National 80-1068, is applied to the release coating with a 5 mil Byrd bar, then air dried for 5 minutes at room temperature and subsequently oven dried for 10 minutes in a forced air oven preheated to 158° F.
2) After cooling to room temperature, a 3 inch wide silicone splicing tape is laminated to the adhesive in the CD direction with a standard 4.5 pound lab roller.
3) Immediately a 2 inch wide, 10 inch long strip is cut and the tape is peeled off with a TLMI release tester at 12 inches per minute and a 135 degree angle. The average release value of the pull is recorded in grams/2 inches.

STM Number 42—Subsequent Adhesion

The STM Number 42 subsequent adhesion test measures the effect of the silicone coating and substrate on reducing the adhesive properties of the National 80-1068 solvent acrylic adhesive to a metal plate. The test strip is obtained from STM Number 44 which is similar to STM Number 8 except that 1 mil polyester liner is laminated to the adhesive instead of silicone adhesive tape.
1) A 1 inch strip is cut from the middle of the prepared sample. (release liner/adhesive/polyester)
2) The 1 inch strip is applied to a clean dry metal plate by rolling twice with the 4.5 pound lab roller.
3) After 30–40 seconds the test strip is pulled off the plate using the TLMI at 12 inches per minute (ipm), 180 degree peel.
4) The control sample is prepared and tested in the same way except the release liner is replaced by polyester.
5)

$$\text{The \% subsequent adhesion} = \frac{\text{Test Average (grams)}}{\text{Control Average (grams)}} \times 100$$

Extractables were measured using RR STM Number 83, described above.

Volatiles were evaluated using a Gas Chromatography/ Mass Spectrometry test, as described above, which is a measure of volatiles that would outgas under high vacuum or high temperature conditions. A known amount of material is subjected to a certain temperature and time. For these analyses 100° C. for 30 minutes were used. The volatiles are captured and directed through a gas chromatograph then to a mass spectrometer to identify the quantity and chemical composition of the different compounds. The technique is very accurate to extremely low levels, and can be expressed in nanograms per square centimeter. The technique is designed to quantify possible contaminants which could damage sensitive microelectronic equipment such as hard disk drive assemblies.

EXAMPLE 2

The second example is similar to the first, in that the substrate is also a 2 mil thick polyester film. However, 15% solids is used (vs. 6% for Example 1). The method for silicone application to substrate is direct gravure, and the target coat weight is 0.40 grams per square meter (gsm) dry. The solvent system is a blend of methyl ethyl ketone (MEK) and cyclohexanone. The formula is as follows:

| Ingredient | Amount |
|---|---|
| Rhodia PC-600 epoxy-silicone | 15.0 parts |
| Rhodia PC-670 silicone additive | 0.75 parts |
| Rhodia PC-702 photocatalyst | 0.45 parts |
| Cyclohexanone | 8.5 parts |
| Methyl Ethyl Ketone | 76.5 parts |

Rhodia PC-600 is an epoxy functionalized silicone commercially available from Rhodia Silicones. Rhod,ia PC-670 silicone additive is an epoxy functionalized silicone used to enhance release properties, also commercially available from Rhodia Silicones.

The processing is done in a similar manner as in Example 1 above. After the silicone is applied, the material is directed through a forced air oven at a temperature of 250° F. and a line speed of 400 feet per minute to remove solvents, and then exposed to UV light (two banks of Fusion H medium pressure mercury UV bulbs rated at 375 watts/in each) to chemically crosslink the silicone release coating. The silicone chemistry system is known in the art, for example, as described in Journal of Coatings Technology, Volume 67, Number 851, December 1995, pp. 71–78. The system is an epoxy-functionalized polydimethylsiloxane polymer, crosslinked by a cationic mechanism.

The properties of this release liner product measured as described in Example 2 are:

| | |
|---|---|
| Caliper | 2.0 mils |
| Coat Weight | 0.21 lbs/3000 square feet |
| | (0.34 g/sq meter) |
| Release Force | 22 grams/2 inch width |
| Extractables | 2.3% of coat weight |
| | (0.79 micrograms/square cm) |
| Subsequent Adhesion | >90% of control |

The release profile can be described as easy release, that is, most pressure sensitive adhesives would peel easily from the surface.

EXAMPLE 3

This example illustrates production of a two-side coated release liner on a polyethylene-coated paper. The paper is a bleached kraft paper coated two sides with high-density polyethylene to a finished basis weight of 61 pounds per 3000 square feet. By coating silicone on two sides, a two-side adhesive or transfer tape may be produced. Often, it is desired that one side of the release liner have higher peel force than the other to ensure the adhesive stays with one side of the web during unwind or lamination procedures in the converting process. This is called a differential release liner. The formulas are as follows:

|  | Amount |
| --- | --- |
| Formula for easy release (SWN56A) | |
| Rhodia PC-620 Epoxy-silicone | 4 parts |
| Rhodia PC-702 Photocatalyst | 0.08 parts |
| Toluene | 48 parts |
| Heptane | 48 parts |
| Percent solids = 4% | |
| Formula for tight release (SWBP5) | |
| GE Silicones UV9315 Epoxy-silicone | 9.0 parts |
| GE Silicones UV9430 Epoxy-silicone | 9.0 parts |
| GE Silicones UV9380C Photocatalyst | 0.55 parts |
| Toluene | 36.92 parts |
| Heptane | 243.25 parts |
| Percent solids = 6.2% | |

GE Silicones UV9315 and UV9430 are also radiation curable epoxy functionalized silicones commercially available from General Electric Silicones. GE Silicones UV9380C. Photocatalyst is a photoinitiator commercially available from General Electric Silicones.

The compositions are applied in a manner similar to Example 1 above. The substrate is coated by double Meyer rod, and then the web proceeds through a thermal oven to remove the carrier solvents. Finally, the crosslinking reaction is initiated by UV irradiation.

The finished release liner properties can be summarized as follows:

| Parameter | Easy Release Side | Tight Release Side |
| --- | --- | --- |
| Cure off Coater | Good | Good |
| Release Force | | |
| 12 inches/minute | 20 g/in | 24 g/in |
| 300 inches/minute | 36 g/in | 48 g/in |
| 600 inches/minute | 31 g/in | 50 g/in |
| 1200 inches/minute | 33 g/in | 51 g/in |
| Coat Weight | 0.30 lbs/3000 sq. ft. | 0.57 lbs/3000 sq. ft. |

"Good" cure off coater indicates that a firm rub with the index finger does not cause the silicone coating to smear or rub off the substrate. Release force is measured using the following test procedure: STM Number 103 is an internal test for Rexam Release for determining the level of release force for a liner using Tesa 7475 acrylic adhesive tape. The tesa 7475 tape is cut into 1 inch by 7 inch strips, applied to the release liner in the cross-web direction, and pressed on by one back and forth roll with a 4.5 pound roller. The sample is placed between 3 inch by 6 inch stainless steel plates with a 1.5 pound weight placed over each stack on top of the steel plate. The weighted sample stacks are placed in an oven at 158° F. for 20 ±1 hours. After the 20 hours, samples are removed from the oven. A TLMI peel instrument is used for measuring release force. The tape is peeled off the liner at the peel speed indicated in the table and at an angle of 135 degrees. The average and peak release values are recorded. Usually, the average value is reported in grams/inch. Coat weight is determined using the test method described above in Example 1.

As it can be seen above, a differential release is achieved at the four stripping speeds, by design the tight side release having higher release force than the easy release side. The stripping speed refers to the peel rate of the adhesive tape off the release liner.

EXAMPLE 4

A 3 mil high-density polyethylene film as the substrate is coated as a two-side differential release liner. The substrate can be natural or pigmented, such as commercially available substrates from Banner Packaging in Oshkosh, Wis. or Huntsman Packaging in South Deerfield, Mass. The high-density polyethylene is manufactured via a blown film process. In this example, silicone-acrylate release coatings are used to provide the release surfaces.

The silicone coating process can be done by techniques such as direct gravure, offset gravure, multi-roll coating, or Meyer rod coating. Often, corona treatment is helpful to raise the surface energy of the substrate and promote anchorage of the silicone to the polyethylene surface. Again, the solvents are evaporated from the surface by forced air or thermal ovens. After the solvent is removed, the silicone can be crosslinked by ultraviolet radiation (UV). An inert atmosphere, such as nitrogen blanket, is recommended as opposed to air, since oxygen is a scavenger for free-radical polymerization mechanism this system employs. The roll is rewound, trimmed or slit to desired width, and packaged for shipment.

The formulation used in the example is as follows:

|  | Amount |
| --- | --- |
| Tight Release Formula (AC19) | |
| Goldschmidt Tego ™ RC-711 Silicone-acrylate | 7 parts |
| Goldschmidt Tego ™ RC-708 Silicone-acrylate | 3 parts |
| Darocur 1173 (Ciba-Geigy) | 0.3 parts |
| Toluene | 15 parts |
| Heptane | 135 parts |
| Easy Release Formula (AC18) | |
| Goldschmidt Tego ™ RC-711 Silicone-acrylate | 4 parts |
| Goldschmidt Tego ™ RC-726 Silicone-acrylate | 4 parts |
| Darocur 1173 (Ciba-Geigy) | 0.24 parts |
| Toluene | 9.0 parts |
| Heptane | 81.0 parts |

Typical properties of the finished release liner materials, measured as described above in Example 1, are expected to be as follows:

| Caliper | 3.0 mils |
| --- | --- |
| Release Force | |
| Tight Side | 25 grams/2 inch width |
| Easy Side | 8 grams/2 inch width |
| Extractables | 2% of coating weight |
| Coat Weights | 0.4 grams/square meter |

EXAMPLE 5

The silicon transfer properties of various release liners are analyzed using XPS as described above. The XPS results for several common types of silicon release coatings and two release coatings of the invention are set forth below:

| Formula Type | % Silicon on Adhesive Surface |
|---|---|
| Tin Solvent | 3.4% |
| UV Solventless | 4.0% |
| Platinum Solventless | 4.0% |
| Platinum Solvent | 6.8% |
| Sample A[1] | 2.9% |
| Sample B[2] | 1.3% |

[1]Release liner of the invention prepared as described in Example 1 above.
[2]Release liner of the invention prepared similar to that of Example 1 above, but with a modified formula, as follows:

| Ingredient | Amount |
|---|---|
| PC-601 | 18.0 parts |
| Heptane | 254.1 parts |
| Toluene | 28.2 parts |
| PC-702 | 0.36 parts |

PC-601 is available from Rhodia Silicones. It is a higher viscosity polydimethylsiloxane than PC-600. Viscosity for PC-600 is approximately 300 centipoise, while viscosity for PC-601 is approximately 5000 centipoise. National Starch 1068 adhesive is wet-cast on the release liner and air dried for five minutes then dried at 158° F. for 10 minutes. A polyester face stock is then laminated onto the adhesive. The adhesive is removed from the liner and tested by XPS. The testing was done with a 40 degree incident angle for the x-rays.

EXAMPLE 6

Samples of release liners of the invention and conventional UV cured silicone based release liners were analyzed for volatiles content by outgassing as described above. The samples were heated at 100° C. for 30 minutes in the dynamic headspace outgassing instrument and analyzed by gas chromatography and mass spectroscopy. The main outgassing components were siloxanes. The release liners of the invention had about one-tenth as much outgassing material as a release liner prepared using a UV cure silicone system applied without solvent. This is in contrast to the a priori expected values of one-fourth as much out-gassing material based solely on silicone coating weight differences of the samples. The results are set forth below.

| Sample | Low Boilers >C6–C10 (ppmw) | Medium Boilers >C10–C20 (ppmw) | High Boilers >C20 (ppmw) | Sum All >C6 organics (ppmw) |
|---|---|---|---|---|
| Sample C[1] 200/200° F. | 1 | 4 | 2 | 7 |
| Sample D[2] 250/250° F. | <1 | 2 | 1 | 3 |
| Sample E[3] No heat | <1 | 23 | 17 | 40 |

Samples C and D are release liners as prepared in Example 1 above, except that Sample C was heated in an oven at a temperature of 200° F. and Sample D at a temperature of 250° F. respectively to evaporate the solvent. Sample E is a conventional UV curable release liner prepared without solvent and cured without a heating step and having a silicone coating weight of about 0.75 pounds per 3000 square feet (1.2 grams per square meter).

Below, semiquantitative amounts of individually identified compounds are listed for each sample:

| Compounds | Sample C | Sample D | Sample E |
|---|---|---|---|
| Alcohol | <1 | <1 | 3 |
| Cyclo-D6 | <1 | <1 | <1 |
| Cyclo-D7 | <1 | <1 | 3 |
| Cyclo-D8 | <1 | <1 | 3 |
| Cyclo-D9 | <1 | <1 | 3 |
| Cyclo-D10 | <1 | <1 | 2 |
| CycloD11 | <1 | <1 | 2 |
| Cyclo-D12 | <1 | <1 | 1 |
| Other siloxanes | 1 | <1 | 2 |
| Total siloxanes Micrograms/cm$^2$ | 0.057 | 0.032 | 0.474 |

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A process for making a release liner, comprising the steps of:
    applying a composition comprising a radiation curable silicone release agent and a photoinitiator in an organic solvent to a surface of a substrate;
    heating said coated substrate, optionally in the presence of high velocity air, under conditions sufficient to remove substantially all of said solvent; and
    exposing said coated substrate to radiation under conditions sufficient to substantially cure said radiation curable silicone release agent to form a radiation cured silicone release coating.

2. The process of claim 1, wherein said composition includes volatile siloxane, compounds prior to said heating step, and wherein said heating step removes essentially of all said volatile siloxane compounds.

3. The process of claim 2, wherein said radiation cured silicone release coating further comprises no more than about 10 ppm volatile compounds.

4. The process of claim 3, wherein said radiation cured silicone release coating comprises no more than about 2.0 ppm volatile compounds.

5. The process of claim 1, wherein said photoinitiator is selected from the group consisting of benzil dimethyl ketal, benzoin, benzoin alkyl ethers, acyloin derivatives, benzophenone, acetophenone, Michler's ketone, acyl phosphine oxide derivatives, iodonium salts, sulfonium salts, and pentafluorophenyl borates.

6. The process of claim 1, wherein said radiation curable silicone release agent comprises at least one compound selected from the group consisting of epoxy and acrylate functionalized silicone compounds.

7. The process of claim 1, wherein said composition is substantially free of metal catalyst.

8. A process for making a release liner, comprising the steps of applying a composition comprising a radiation curable silicone release agent in an organic solvent to a surface of a substrate wherein said composition further includes volatile siloxlane compounds;

heating said coated substrate, optionally in the presence of high velocity air, under conditions sufficient to remove substantially all of said solvent and essentially all of said volatile siloxane compounds; and exposing said coated substrate to radiation under conditions sufficient to substantially cure said radiation curable silicone release agent to form a radiation cured silicone release coating comprising no more than about 10 ppm volatile siloxane compounds.

9. The process of claim 8, wherein said radiation curable silicone release agent comprises at least one compound selected from the group consisting of epoxy and acrylate functionalized silicone compounds.

10. The process of claim 8, wherein said radiation cured silicone release coating comprises no more than about 2.0 ppm volatile compounds.

11. The process of claim 8, wherein said composition is substantially free of metal catalyst.

12. The process of claim 8, further comprising the step of applying said composition comprising a radiation curable silicone release agent in an organic solvent to a second opposing surface of said substrate.

13. The process of claim 8, wherein said composition comprises about 1 to about 90 weight percent radiation curable silicone release agent and about 99 to about 10 weight percent solvent.

14. The process of claim 13, wherein said composition comprises about 4 to about 20 weight percent radiation curable silicone release agent and about 96 to about 80 weight percent solvent.

15. The process of claim 14, wherein said composition comprises about 6 to about 15 weight percent radiation curable silicone release agent and about 94 to about 85 weight percent solvent.

16. The process of claim 8, wherein said solvent is selected from the group consisting of aliphatic solvents, cycloaliphatic solvents, aromatic solvents, ketone solvents, and mixtures thereof.

17. The process of claim 16, wherein said aliphatic solvent is selected from the group consisting of hexane, heptane, and mixtures thereof.

18. The process of claim 16, wherein said cycloaliphatic solvent is cyclohexane.

19. The process of claim 16, wherein said aromatic solvent is selected from the group consisting of xylene, toluene, and mixtures thereof.

20. The process of claim 16, wherein said ketone solvent is selected from the group consisting of methyl ethyl ketone, cyclohexanone, methyl iso-butyl ketone, and mixtures thereof.

21. The process of clain 8, wherein said applying step comprises applying said composition in an amount sufficient to provide a coating weight of about 0.1 to about 1.0 grams per square meter (dry).

22. The process of claim 21, wherein said applying step comprises applying said composition in an amount sufficient to provide a coating weight of about 0.1 to about 0.6 grams per square meter (dry).

23. The process of claim 22, wherein said applying step comprises applying said composition in an amount sufficient to provide a coating weight of about 0.1 to about 0.3 grams per square meter (dry).

24. The process of clain 8, wherein said exposing step comprises exposing said coated substrate to ultraviolet radiation.

25. The process of clain 8, wherein said exposing step comprises exposing said coated substrate to electron beam radiation.

26. The process of claim 8, wherein said radiation cured silicone release coating comprises no more than about 1.5 micrograms per square centimeter total extractables.

27. The process of claim 26, wherein said radiation cured silicone release coating comprises no more than about 0.9 micrograms per square centimeter total extractables.

28. The process of claim 27, wherein said radiation cured silicone release coating comprises no more than about 0.2 micrograms per square centimeter total extractables.

* * * * *